United States Patent [19]

Holzbaur

[11] Patent Number: 4,522,143
[45] Date of Patent: Jun. 11, 1985

[54] FOLDING BOAT WITH BOW AND STERN SECTIONS

[75] Inventor: Siegfried Holzbaur, Stuttgart, Fed. Rep. of Germany

[73] Assignee: Carabo A.G., Glarus, Switzerland

[21] Appl. No.: 462,269

[22] Filed: Jan. 31, 1983

[30] Foreign Application Priority Data

Jan. 29, 1982 [DE] Fed. Rep. of Germany ....... 3202885

[51] Int. Cl.³ .................................................. B63B 7/00
[52] U.S. Cl. .................................... 114/344; 296/157; 114/353
[58] Field of Search ............. 114/353, 361, 344, 77 R, 114/56; 296/157; 440/54

[56] References Cited

U.S. PATENT DOCUMENTS

| | | | |
|---|---|---|---|
| 2,156,938 | 5/1939 | Edwards | 440/54 |
| 2,664,577 | 1/1954 | Sanborn | 114/353 |
| 3,090,973 | 5/1963 | Levinson | 114/353 |
| 3,121,238 | 2/1964 | Levinson | 114/353 |
| 3,173,160 | 3/1965 | Jacobson | 114/353 |
| 3,594,834 | 7/1971 | Steensen | 114/353 |
| 3,831,208 | 8/1974 | Smith | 296/157 |
| 3,940,813 | 3/1976 | Konstantinov | 114/353 |
| 3,972,544 | 8/1976 | Soot | 296/157 |
| 4,333,191 | 6/1982 | Long | 114/56 |

Primary Examiner—Trygve M. Blix
Assistant Examiner—Stephen P. Avila
Attorney, Agent, or Firm—David A. Jackson; Daniel H. Bobis

[57] ABSTRACT

The invention proposes a foldable boat having a rearward portion mounted on hinges extending medially of the boat and arranged so as to fold forwardly over the front portion of the boat. The front portion of the boat includes retractable wheels so the boat may form a trailer for an automobile. These is also provided a retractable wheeled structure for assisting in moving the boat from the water over muddy surfaces when the boat is to be transported on the highway. The power plant for the boat is mounted substantially medially of the boat with the drive shaft depending therefrom into the water.

26 Claims, 14 Drawing Figures

FOLDING BOAT WITH BOW AND STERN SECTIONS

BACKGROUND OF THE INVENTION

The invention is based on a folding boat with a bow and stern section as defined by the main claim. Folding boats are already known in which the primary purpose for the folding process consists of bringing a smaller, preferably paddle-actuated boat into positions in which it would be undesirable for the boat to remain, or where placement should be avoided due to the danger of theft. The expenditures for the production of this folding feature with locking devices etc. are excessive and prove unacceptable in comparison to the utilization and advantages of a folding boat, thus eliminating existing prior art from any marketing successes.

Basically, the same applies to known prior art wherein the side walls show downward-tilting wheels, as well as a mountable hitch-rod to allow for land travel. The folded or tilted-up wheels are placed on the outboard section and are a hindrance to the docking capabilities of the boat, as well as being exposed either to the spray water or to the water while docking, particularly salt water which will lead to the corrosion of the bearings.

It has also been proposed to provide a folding boat with fixed wheels that are tiltable out of the water which regardless of its unfavorable wheel positioning will allow for a tent-like topmount for each of the sections independent from one another. The entrances to these tent-like topmounts are always opposite the folding side. The boat is intended as a smaller gliding boat with an outside motor. Furthermore, the hull of the bow section is designed as a gliding boat with an intermediate tunnel, thus providing a hydroshield for the linear alignment of the floor between the gliding boat and stern sections. The bow section is independently usable as a gliding boat so that the stern section equipped as a mobile unit and with a hitch-rod could possibly be utilized in combination with a tent-like topmount assembly to serve as overnight shelter on land. The tunnel is not continued into the stern section since this would result in an unevenness in the bottom of the boat. Despite the fact that the hydroshield within the tunnel, which is necessary in this type of construction, will result in an increasing higher water resistance, this type of construction provides a modified gliding boat equipped with a much heavier stern section which results, of course, in an impractical but much heavier boat with the option of being motor actuated.

OBJECTS AND SUMMARY OF THE INVENTION

The folding boat according to the invention as revealed hereinafter in the main claim has the advantage over the prior art that at a relatively low weight for the roof of the mobile section, a nonetheless intrusion-safe hard shell is provided by means of a tilt-up section as long as the boat is in its folded-up position on land, while in the water such hard shell is unnecessary, and basically only a spray water and resistant type of cover is required. A particular advantage is that the door disposed on the back face wall provides easy access between the sections in the folded-out position of the boat and which, if desired, may be locked, and that in a folded-up position of the boat this door will serve as the main entrance to the trailer portion. Additionally, the straight line face wall provides optimum possibilities for the installation of a door. The room can thus be furnished independently from its respective use, and be locked. The topmount assembly on the mobile unit can, however, be of an extremely sturdy construction, for example, of fiberglass reinforced material, so that in a folded-out position it may be placed by itself on a camp ground, sufficiently secured against breakins. This results in a mobile unit for relaxation, vacations, trips and sports, while at the same time allowing for a high degree of trailer comfort, combined with optimum driving capabilities, maneuvrability, good boating characteristics, and thus great flexibility on land as well as in the water. Personal belongings can be locked in the trailer room without any danger of theft, and at the same time there are no difficulties in storing the boat during the winter. Access to the mobile unit via the door provided transverse to the moving door can be accomplished without any danger.

In a design as defined by the instant invention, the height of the hull of the mobile unit is greater than the one of the tilt-up section. Thus, on one hand, the tilt-up section is kept as light as possible, thereby minimizing the mechanical output during the tilt-up process. On the other hand, the tilt-up section then only serves as a "second roof in its folded-up position" so that the rail mounted in respective distances on the tilt-up section is placed on the edge of the mobile section. The area between rail and shell of the tilt-up section can be designed to as to allow the influx of light to the windows of the mobile section in the folded-up position of the boat. The threshold of the door located on the face wall has to be provided above water lever, thus avoiding water leakage into the trailer room via the separating gap between the front and hind sections of the folding boat. Thus, when the vehicle is on the street the height which needs to be overcome is relatively great. For this purpose the instant invention intends a ladder with a parallelogram adjustment feature which serves, on the other hand, when the boat is in the water in its folded-out position, as boat ladder. This is to say, that in the folded-out position of the boat the threshold is easily crossed.

Whether the stern or the bow sections serve as the tilt-up section is mostly dependent upon the utilization, whereby each possibility has its own specific advantages. Thus, a higher load on the bow section, if this section is designed as the mobile unit, presents advantages in normal motor boating. Vice versa, for sailing purposes it is attempted to provide a heavier stern section, therefore this section will serve as the mobile unit. During the sailing operation the sail above the mast will transmit additional momentum onto the bow section, so that a heavier stern section would have an equalizing affect as regards the longitudinal axis of the boat.

The instant invention affords the possibility of mounting a top assembly on the the tilt-up section in its folded-out position. Thus, the top assembly can be designed as having a roof with a connection to the rail, i.e., the edge of the tilt-up section. Hereby an additional room is gained, similar to tent add-ons in the front of a trailer. This space between the cabin roof which could possibly be reinforced by supporting posts, and the rail, i.e., the rail and the section shell, could be covered by canvas-type cloths.

In a design such as is proposed by the instant invention, the roof of the topmount is adapted to the shape of the roof of the mobile section, and in a folded-up position of the boat is positioned between the roof of the mobile section and the boat shell of the tilt-up section, and, after the boat is folded out and upon lifting up can be pivoted by 180 degrees and thereby be moved into a covering position of the tilt-up section. On one hand, this accomplishes that the roof of the topmount assembly is cleared away during road travel, while on the other hand providing a very sturdy roof that is easily mounted. Lift-up is achieved parallel to the position of the roof height-adjusting parallelogram which on one mounted side (topmount or roof of the mobile section) provides a torsion hinge for the horizontal pivoting motion. The parallelogram further permits that the topmount roof, depending on the pivoting position of the parallelogram, extends over the tilt-up section to a lesser or greater extent.

In accordance with another design of the instant invention, the roof of the mobile section provides a cockpit opening with a lid that is adjustable to various positions by way of an adjustment element, whereby the adjustment element is actuated by a crank whose shafts are fixable in pipes which are connected to the roof of the mobile section, i.e., the lid is lifted up from the roof and is in the direction of or counter to the moving direction tilted, slid sideways or flatly folded back. This cockpit opening is advantageously located in the side of the roof of the mobile section which faces the edge of the boat used for docking. Beneath the cockpit opening is a navigation control area which provides good visibility for the skipper to determine respective situations during his navigational maneuvres. The lid of the cockpit can be pulled down over the roof edge, and with its vertical section can serve as a locking device for a door in the board wall. This will allow the skipper easy access to the outside while docking, for example, to tie up the boat.

Another advantageous embodiment of the invention allows the selection between two types of actuating elements for the mobile unit's land transfer. One of these elements intends the retrieval of the wheels into wheelcases, so that the bearings would not be circumflushed by water, and in particular salt water, and whereby the wheels are not a hindering aspect on the outboard. The necessary wheelcases serve as seating or sleeping elements inside the "trailer" cabin.

Advantageously, the wheelcase could extend over the full length of the boat to thereby achieve a flow tunnel in a longitudinal direction beneath each side of the boat, to achieve additional moving stability. The wheel pivoting movement can be coupled with the boat folding movement, so that the wheels upon fold-out of the tilt-up section are retracted simultaneously, or are released in the same fashion during the fold-up movement.

Another possibility for land transfer would be the provision of an undercarriage with wheels and a hitch-rod adapted to the shape of the boat, and from which the boat could be easily slid into the water when the tilt-up section has been folded-outward and is at least partially submerged in the water. As of a certain size of the boat, this watering cannot be achieved without any great difficulty. It is particularly difficult to pull the boat back out of the water and onto the undercarriage. The main problem thereby lies in the deviation of the center of gravity which is caused by the fold-out movement of the boat, because the undercarriage is adapted to the center of gravity of the folded-up boat. According to an independent embodiment of the invention, a supporting moving element is placed on the mobile section as regards the center of gravity of the folded-out boat; the supporting moving element being pivotable, and whereby the weight of the entire boat can be shifted after the fold-out process. By way of this supporting moving element it is possible to retrieve the undercarriage before the boat is placed in the water, or in boats with separate undercarriages, the latter can then be easily removed. The supporting moving element provides the further advantage, for example, that the boat can easily be pushed on land in unexpected upcoming storms, and at any location. To avoid sinking into soft ground, such as sand, during this move the supporting moving element is actuated by a moving chain or a moving belt. This supporting moving element can be retracted into the wheelcase. This actuation can be achieved by way of a crank from outside the boat while on land, and from inside the boat while in the water. The reeling element can be designed in simple fashion, and in a particularly water-resistant manner (simple gliding bearings), since it is not intended for high speeds on the road.

Through a further independent embodiment of the invention the hull of the folding boat becomes a "trimaran" by way of the flow channels. Furthermore, the bow of the middle (main) hull section can be designed as a wave undercutting buldge in the direction of movement. The portion being circumflushed by existing waves is thereby relatively small, and even the stern section does not submerge into the water undesirably low. The supporting hull portions can have a certain width and are advantageously mounted onto the main hull in a dismountable fashion. Thereby, the side hull sections could serve as storage containers, or based upon the water displacement width, could generate a genuine support effect. The fact that the boat remains largely in its original longitudinal inclination due to the buldging bow, results in a water column being formed in the flow tunnel, whose relative speed is lower than the outer speed between water and boat. As of a certain speed, this tunnel acts like a boat body, whereby the boat is completely lifted out of the water and thus shows decreased water displacement which in turn leads to a respectively reduced moving resistance. This can, at certain speeds, lead up to a gliding function. Again, based upon the bulging bow and the retained boat inclination, the boat'screw also remains in an optimum position that can be predetermined.

Based on a further embodiment of the invention, the boat's motor is located midship and thereby advantageously accessible from the front even in a folded-up position of the boat without, in a folded-out position of the boat, proposing a hindrance by parts extending over the board wall, such as is the case with an outboard motor. Thereby, the motor is fully accessible during a folded-up or folded-out position of the board. For example, this may prove important for the exchange of the screw during operation of the boat. The motor is simply moved upward and the screw is exchanged. Additionally, a boat with a motor (screw) arrangement midship is essentialy more maneuverable, for example by docking or undocking transversely to the actual moving direction. By placing the boat screw within a floor tunnel it is further possible for the boat to be navigated in extremely shallow water, without any danger to the boat screw. In accordance with the instant invention, the floor tunnel is designed as a channel disposed in the mobile unit whereby this channel simultaneously serves as the wheelcase for the moving elements. Since two such channels are provided, it is possible to also implement two screws as well, for example, both screws being actuated by a single motor. It is also possible with a simple design to apply a screw-actuated electric motor instead of a combustion engine. By way of an emergency generator it is possible to generate the necessary power which is subsequently stored in a battery and transmitted to the electric motor. This version will prove the boat independent from any specific regulations for certain waterways, by simply exchanging the motor. The height adjustment feature of the motor and subsequently the depth of submersion of the screw can prove advantageous whereby in deeper waters the screw is submerged more to thereby optimize the hydrodynamic conditions between the flow produced by the screw and the flow resulting alongside the boat hull. It's placement midship during the folded-out position is minimally disruptive to the layout of the face wall if a cover is selected which could simultaneously serve as a table with a slightly higher rim. The face wall could further serve to store a tool case which could possibly be mounted as a fold-down element on the wall, so that again, in both folding positions full access is warranted. Such case could also house other objects necessary for the topmounted roof.

A specific and independent embodiment of the invention is the application of a mass equalizing spring system during the tilting motion, so that even a relatively weak person would be independently capable of tilting the rather heavy tilt-up section. In addition to a whole series of known power-equalizing systems (often used in garage doors), this offers a servo system on the basis of gas or other types of springs. The entire system can be favorably disposed on the inside of the board walls since the major points of effect are located on these walls.

A folding boat as defined by the instant invention provides for an extreme manifold of uses whereby, accordingly, a great variety of designs of the individual elements is provided. According to the invention it is thus possible to select a modular system which, based on the respective use, could include a galley, navigation controls, shower etc. capable of being connected in block form and further capable of being substituted by other modules. Thereby, depending upon the purpose or use of the invented folding boat, the bow or stern section can serve as tilt-up section, and one of these sections can be extended accordingly, thus achieving an overall extension. In such an extension, the tilt-up section would no longer cover the entire mobile section.

BRIEF DESCRIPTION OF THE DRAWINGS

Two exemplary embodiments of the object of the instant invention are shown in the drawings and are more closely defined in the following description. Shown are.

DESCRIPTION OF THE PREFERRED EMBODIMENTS

Figure 1:
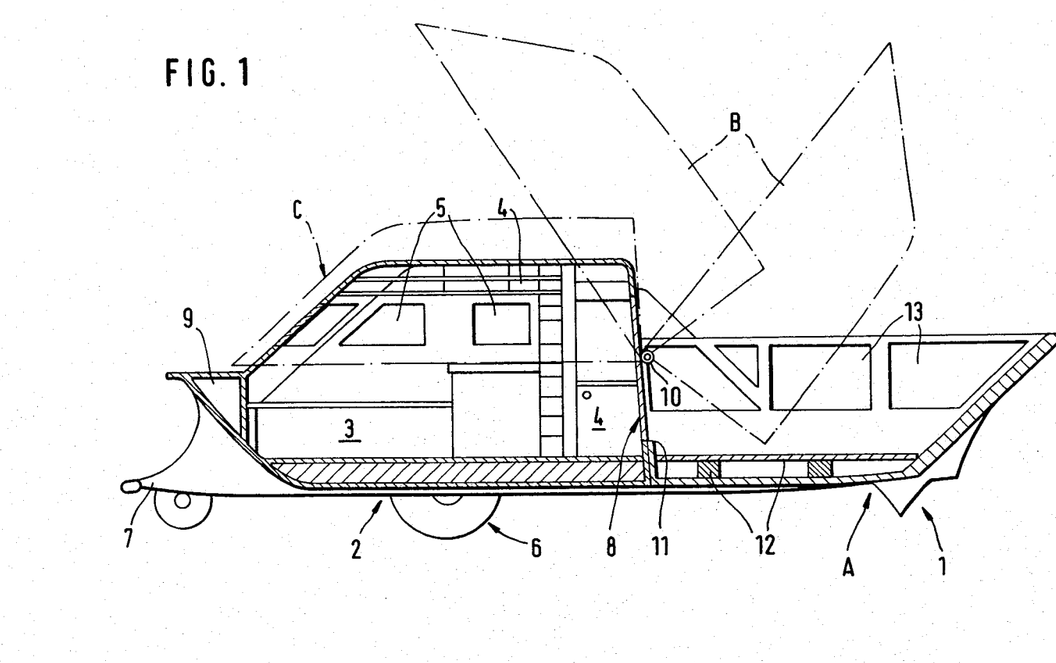
FIG. 1 with the principles of the instant invention, whereby stern section is folded over the trailer section, is shown as a longitudinal section and in various tilting positions.

The folding boat shown by way of example in FIG. 1 is a first exemplary embodiment of the principles of the instant invention, in which the stern section 1 of the boat is folded up over the bow section 2 designed as a trailer section. As shown in the longitudinal section, section 2 is designed as a complete trailer, equipped with seats 3, cupboards 4 and windows 5, as well as all the equipment desired by the respective user. For cross-country travel an undercarriage with wheels 6 has been provided, as well as a hitch-rod 7 by way of which the trailer is hooked up to a pulling vehicle, for example, a passenger car. The trailer at the opposite side of the hitch-rod provides an extrance door 8, and a storage space 9 is provided above the hitch-rod, which could possibly have an electric winch as well as other transporting materials.

With this arrangements, trailer section 2 serves a mobile element, pivotable around a joint 10, and the stern section 1 is provided as a tilting element or section. In position A the tilting element is fully extended, so that the two facing or opposing walls of tilting element 1 and mobile element 2 are in contact. Both parts provide the necessary recess for the door 8 on the respective facing wall, whereby the recess extends down to threshold 11 which is above water level. Since at this point of connection no dashing waves are present but merely the static pressure intruding through the crack or gap in the face walls, no water will leak into the cabin. To achieve grading of the bottom of the boat and to provide a hold for the collected water masses, a lath floor 12 is provided. Position B defines the various tilt positions of the tilting section 1. In position C the tilting section 1 is fully folded over the mobile element 2, whereby additional protection against outside influences is achieved. This additional protection does not only prove advantageous to avoid break-ins, but foremost protects against atmospheric influences. When, for example, the folding boat is parked during the winter, the stern section 1 provides tremendous protection against snow and rain. This section is at any rate designed in a particularly water-resistant manner. Thereby, the manufacturer of this folding boat is provided the option of manufacturing the trailer atop the mobile unit in lighter and more sensitive materials. To provide for sufficient lighting in the trailer section in a folded-up position, the tilt section 1 has openings 13 or light transparent plates which, in a folded-up position of the boat are placed opposite the windows 5. These openings 13 are in the folded-out position of the boat, that is, when the boat is in the water extensively higher than the water level so that there is no immediate static water pressure present, and the openings can be closed off with canvas-type cloths.

Access to a trailer from the rear facing wall shows very basic advantages. Firstly, the trailer can be parked in very small spaces between other vehicles without causing any damage when the doors are opened. On the other hand, it is advantageous not to be in the line of traffic when exiting from the trailer. The design of the hydrodynamic stern section results in an aerodynamic shape in its folded-up position. Thereby, the essentials become practical, and advantageous. In a folded-out position as a boat, the cabin is provided which allows for a level of comfort specifically designed for trailers, and which further allows immediate access to the back section of the boat. Even a fold-out on land and support of the tilt section 1, i.e., leaving the boat hitched to the vehicle, will result in an extensive increase in protected usable space, namely extending from the mobile section to the entire space of the trailer and tilt sections. The tapering of the mobile section on the side of the pulling vehicle is designed in regard to hydrodynamic considerations, and does not only insure aerodynamic advantages, but also simplifies switching positions with the mobile unit, i.e. maneuvering within very small radii.

Figure 2:
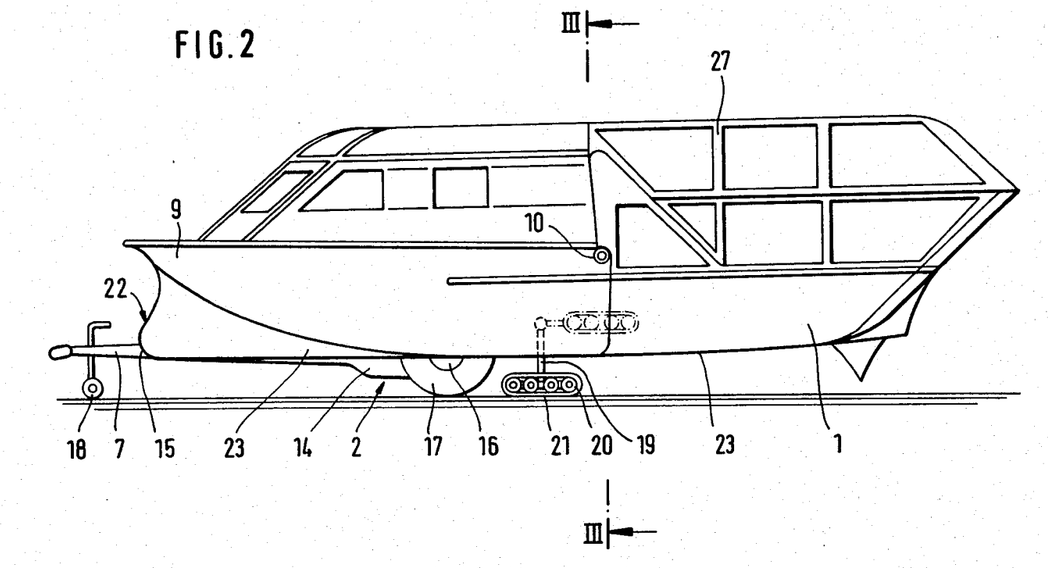
FIG. 2 is a first exemplary embodiment in an outside view, with the stern topmount, movable element and supporting moving element.

Of course, the back facing wall of the moving section could be recessed as relates to the folding level. This is merely a question of an advantageous construction, and in particular, the maximum utilization of the available space. Subsequently, the mobile element could be extended so that the tilt-up section would only cover a smaller portion of the mobile section. FIG. 2 shows the first exemplary embodiment in an outside view; in FIG. 3 a cross section along the line III—III of FIG. 2 is shown. Here, the folding boat is shown in its folded-out position. The moving element 2 is placed on a trailer element 14 and at 15 attached thereto in a dismountable fashion. The axle 16 of the wheels 17 is disposed just behind the center of gravity of the folding boat. This results in a slight tilt toward hitch-rod 7 during road travel, i.e., toward the supporting wheel 18. In order to simplify removal of the trailer element 14, a supporting moving element 19 is attached to the mobile section, which would effect the folding boat at about the center of gravity which exists when the boat is in a folded-out position and which is respectively farther back in the moving section. This supporting moving element 19 is, as shown in the dotted line, retracted inward and water-resistant which is of particular importance in salt water. For example, the supporting moving element 19 is equipped with reels 20 around which a chain or belt 21 is disposed. This will prevent the supporting moving element from sinking in too deeply on soft ground, especially wet ground. This supporting moving element 19 can be tilted outward and used even in situations when the boat has to be placed on land for some reason. For additional assistance the cable winch located in the bow storage chamber 9 could be applied. As soon as the supporting moving element is tilted outward, the tilting point can be shifted from wheel 17 to the roller system 20, 21 so that after decoupling of the hitch-rod 7 the released trailer element 14 can be removed and pulled out from under the mobile section 2. One of the basic advantages is, however, the resistance against water, particularly salt water, which with the highly sensitive bearings in road vehicles would have a disasterous impact, demonstrating the reasons why thus far amphibious vehicles did not succeed. The supporting moving element can be actuated from outside the boat while, for example, on land, and from within the boat while in the water.

The boat hull is designed with a bow 22 extending foward for hydrodynamic reasons. In order to insure that water displacement during operation is particularly favorable from a flow point of view, this wave undercutting buldging bow 22 changes into a keel-shaped middle portion 23. As shown in connection with FIG. 3, the side walls 24, particularly of the mobile section, are extended downward in such a fashion so that between the covering apron 25 and keel 23, channel recesses 26 (flowing channels) are provided which on one hand provide for stability against capsizing, and on the other hand, serve to house the supporting moving element, i.e., as a wheelcase for wheels 17. These covering aprons could advantageously provide a hollow space which could serve as containers for fuel or other liquids.

In accordance with the requirements it is possible to provide a topmount 27 on the stern of the boat, namely tilting section 1; the topmount being practically designed in a light construction and relatively easily stored in some storage space. Such a storage space could, for example, be the keel space.

Figure 3:
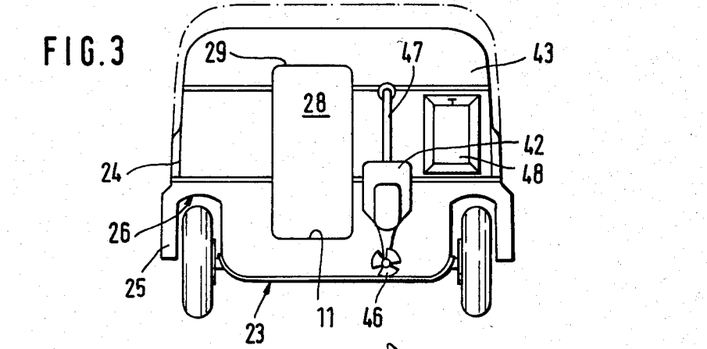
FIG. 3 is a cross-section along the line III—III of FIG. 2.

Section III—III shows the door 28 from the outside. This door is in its light opening position bordered by threshold 11 below and a lintel 29 which in a folded-up position of the boat is approximately determined by the location of the threshold 11 of the tilt-up section.

Figure 4:
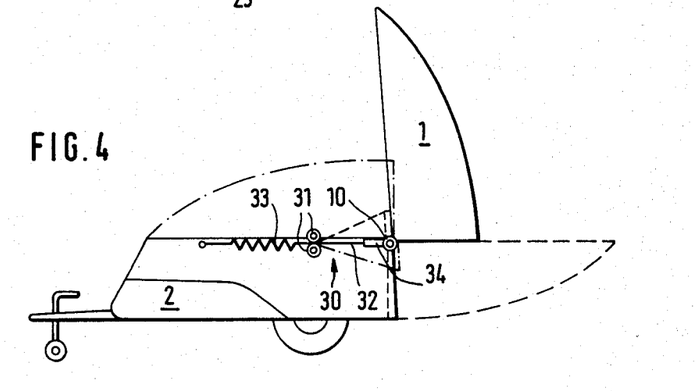
FIG. 4 is a simplified view of the energy saving tilting assembly.

FIG. 4 is a schematic view of the servo element to simplify the tilting motion. In this schematic view a rope 32 is running across reels 31 and which is tensioned by a spring 33. Rope 32 at one end effects a lever 34, which at the other end is coupled with the tilt-up section 1. The spring 33 is always tensioned when the folding boat, as shown in the dot-dash line, is either folded-up or folded-out. In the position shown in the solid line, the spring 33 is extensively relaxed, and the tilt-up section 1 as regards the or joint 10 is balanced as far as possible. It is thereby possible to achieve the folding process without any physical exertion. Such mass compensating reserve capabilities are, for example, applied to garage doors which are designed as tilting doors. In order to be resistant against atmospheric influences, the application of gas chambers is recommended.

Figure 5:
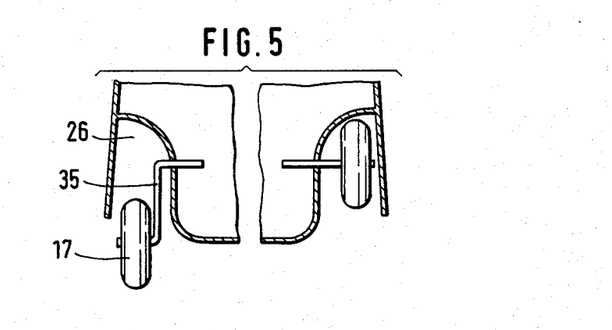
FIG. 5 shows the principle of the retrievable undercarriage.
Figure 6:
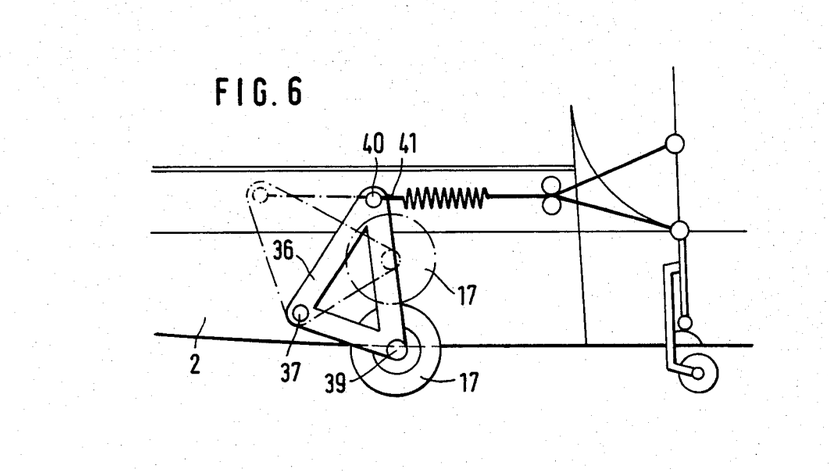
FIG. 6 is an examplary embodiment of a retrievable undercarriage.

FIG. 5 is a simplified view of the trailer element which is directly coupled with the mobile section and which is "retrieved" for in-water operation. The wheel assembly 35 of the wheels 17 is, in this instance, for purposes of explaining the principle, merely shown as a crank whose one end serves as wheel shaft, and the other as a pivoting shaft. The possible layout of such a moving assembly is shown in FIG. 6. A triangular control 36 is pivotably displaced at 37 on a holder which in turn is attached to the boat body 2. Wheel 17 is displaced at the triangular point 39. The third triangular point 40 is effected by a lift-up element 41 by way of which point 40 is shifted to the left during the retrieval of the wheel 17, whereby wheel 17 will take the position shown in the dot-dash line, at which the moving element is fully retrieved. This moving element assembly can be coupled with the energy saving adjustment (energy reserve element) 30 of the folding system (FIG. 4). Thereby, the moving element would always be extended down while the folding boat is folded up, and the moving element would be retracted when the tilt-up section is tilted outward for boat use.

Figure 7:
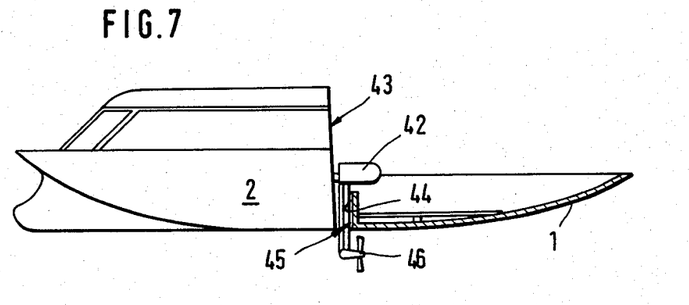
FIGS. 7 and 8 show the location of the motor.
Figure 8:
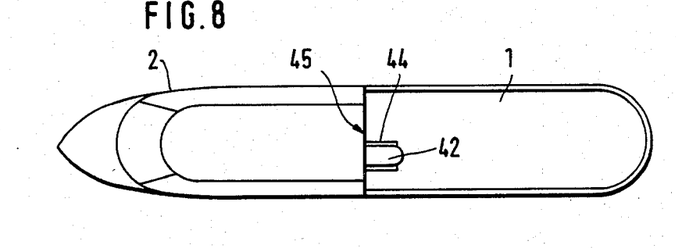

FIGS. 7 and 8 show the placement of a motor. The boat motor 42 is mounted as a midship motor on the back face wall 43 of mobile section 2 (also see FIG. 3). In the folded-up position of the boat the motor 42 is thus easily accessible from the outside. In order to accomplish an undisrupted fold-up procedure, the stern section 1 provides for a respective recess 44, thus resulting in a vertical shaft during the folded-out position. The height of motor 42 can be adjusted on a rod 47 so that in turn the screw 46 has a mar drafted to a lesser or greater extent. This can be of particular importance in shallow waters when it is to present grounding of the screw. Furthermore, for road travel and the folded-up position of the boat, the motor 42 is disposed at a high level to avoid damage. The motor can also be provided with a protective cover by means not shown, which would also cover the screw. The midship motor has at any rate the advantage that the boat is essentially more maneuverable than boats with motors at the stern. For example, if the screw 46 is turned diagonally to the longitudinal axis of the boat, the boat is capable of docking or undocking vertically to to shore.

In accordance with an embodiment (not shown), it is possible that the motor will actuate 2 screws which could, for example, be operating in the channel recesses (FIGS. 2 and 3). The boat motor 42 could be provided in the form of a known outboard motor.

In addition to the motor it is possible to dispose a tool or storage container 48 on the face wall 43 of the moving section; the storage container always being accessible in a folded-up and folded-out position of the boat (see FIG. 3).

Figure 9:
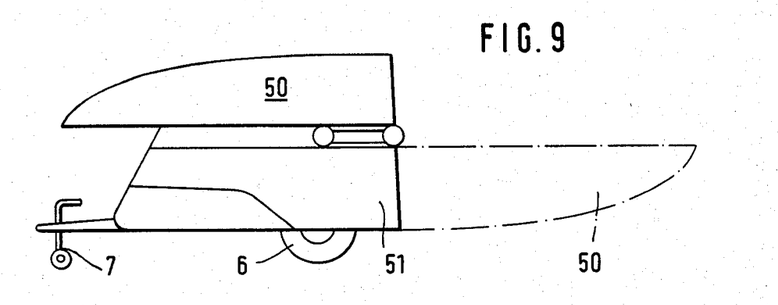
FIGS. 9 and 10 are second exemplary embodiments with a tilt-up bow section.
Figure 10:
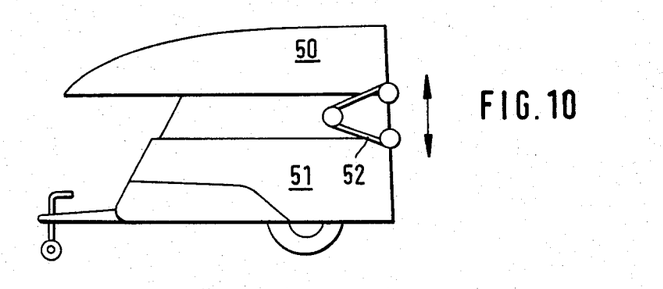
Figure 11:
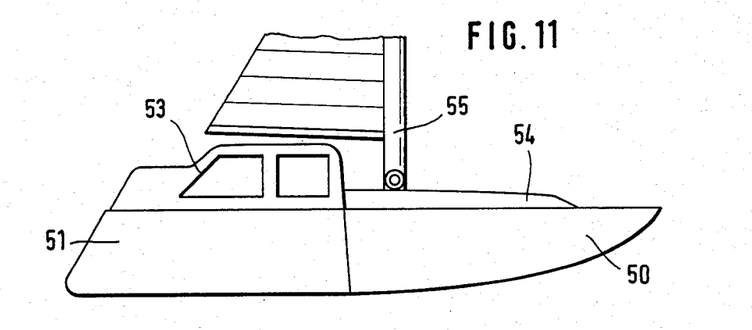
FIG. 11 is a second exemplary embodiment equipped as a sailboat.

FIGS. 9 through 11 show the second exemplary embodiment, whereby the bow section 50 is intended as the tiltable element over the stern section 51. The stern section 51 then serves as a moving or mobile section with moving element 6 and hitch-rod 7. In this second exemplary embodiment the center of gravity, as far as the boat is concerned, is located farther toward the back than in the first exemplary embodiment. This may be of importance depending upon the respective utilization, for example, the use as sailboat. The fixed cabin is thereby located in the stern section and the entrance remains in the middle.

As for the remainder, the same applies as outlined for FIG. 1 so that further explanations are unnecessary.

If the head space in the mobile unit 51 serving as a trailer is insufficient, the folded-up bow section 50 can be lifted up by way of a hinge joint 52. This lift-up procedure can, for example, be used during the winter or during travel while the tilt-up section 50 is folded down as a roof.

The second exemplary embodiment shown in FIG. 11 shows the boat equipped as a sailboat. In addition to the fixed cabinmount 53 on the stern section 51, an easily demountable cabin assembly 54, which also serves for the holder of a mast 55, is intended for the box section 50. This cabin assembly 54 can be designed in a manner so that during transport it is reversed and laid down into the floor of tilt-up section 50, thus avoiding any transportation problems. The latter is basically true for all demountable elements which, according to their facilitating design, can be placed in the floor segments.

Figures 12, 13, 14:
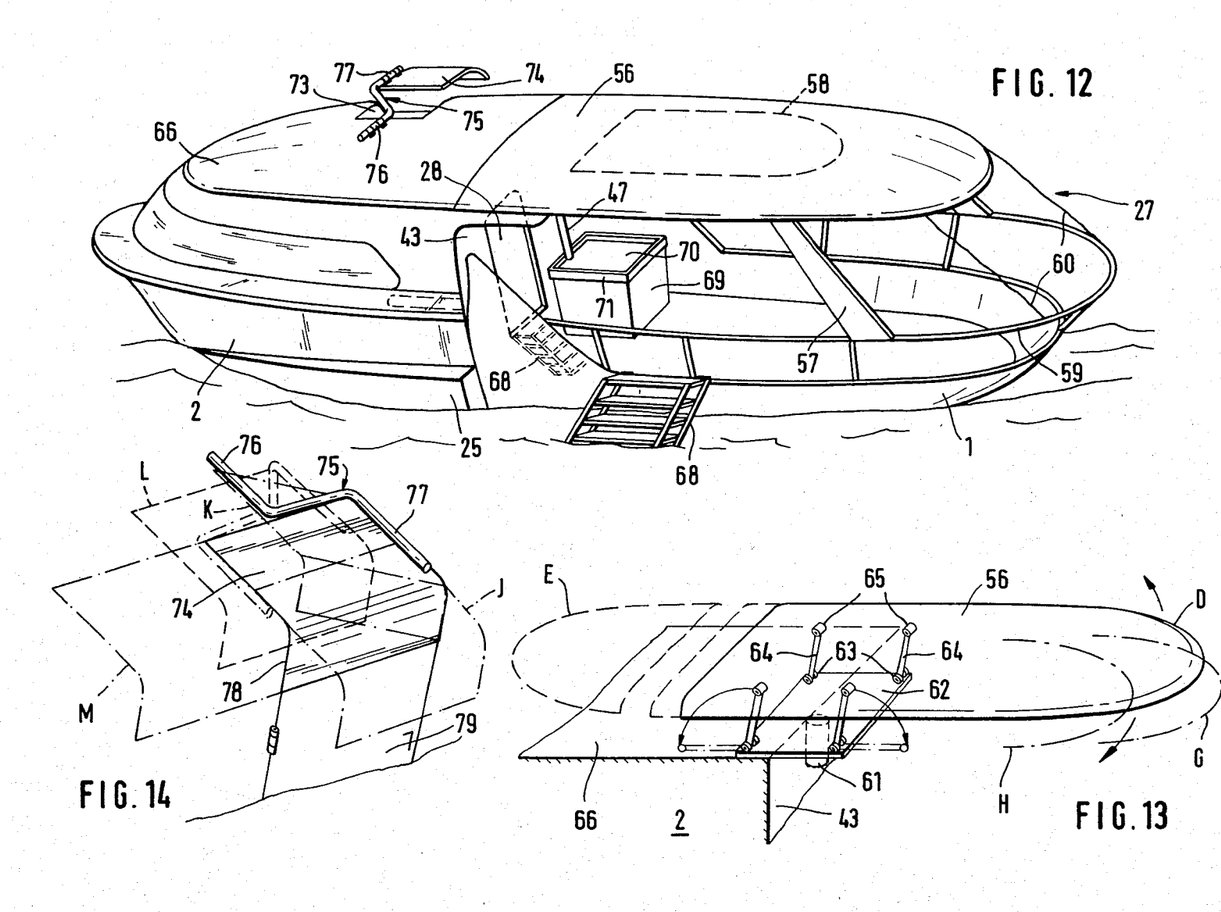
FIG. 12 is the first exemplary embodiment shown as a perspective, with a topmount and cockpit.
FIG. 13 shows the topmount roof of FIG. 12 in various positions.
FIG. 14 shows the cockpit lid in various positions.

FIG. 12 shows the first exemplary embodiment as in FIGS. 1–8 in a perspective view, namely in a folded-out position, with a topmount roof covering the stern section, and with the boat in the water. In its folded out position the bow section 2 with aprons 25 and the stern section 1 give the impression of a one-piece boat. This impression is amplified if the roof 56 of the topmount 27 above stern section 1 is constructed of a sturdy material as shown in the exemplary embodiment of FIG. 12. The problem is that this sturdy roof has to be designed in a manner so as to allow transport during the folded-up position with out any hindrance. According to the instant invention this is achieved in that it is adapted to the roof of the mobile unit and that it lies thereon during transport, prior to tilting the stern section over it. For mounting during in-water use, this topmount roof 56 is pivotable in a 180 degree angle on its base, namely in a position as shown in FIG. 12. By additional supports 57 this position can be secured. It is further feasible that, for example, the middle section (as shown in the dashed line) may provide for recesses 58 which would provide for a sun inlet. It would further be possible to provide canvas-type coverings between the topmount 56 and rail 59, similar to the one applicable between stern section 1 and rail 59.

FIG. 13 shows how the design of the mechanism serving for the 180 degree pivoting motion of the topmount 56 may operate. The topmount 56 is thereby shown in an X-ray type of view. However, it could also be presumed that it is fabricated in a transparent material, namely in order to more clearly show the mechanism itself. Disposed in the face wall 43 of the mobile section 2 is a sleeve (not shown) which houses a pivotable shaft 61. Attached to the face wall of this shaft 61 is a base plate 62, mounted vertically to the shaft axis and which at its four corners has hinges 63 for levers 64 which in turn are at their other ends connected with the topmount 56 via hinges 63. These hinges 63 and 65 together with the plate 62 and topmount 56 form a parallelogram which permits the lifting up of the roof in the shown extended position. Shaft 61 then permits the swivel of the plate 62 and thus the roof 56 on a respective level it has by then assumed. It is thereby possible to allow for parallel lift-up of the roof 56 in a sturdy manner, and to prove it swivable from its one position (for stern section) to its other positions (for road transfer). Solid line D in FIG. 13 demonstrates where stern section is covered and in the dash-line, its position for road transfer. The roof is swivelled by 180 degrees from its position D to its position E, and then lowered onto the roof 66 of the mobile section via the levers 64.

A further advantage of the parallelogram mechanism is that even in a position for covering the stern section, two alternatives can be applied. In the dot-dash line version the levers are folded toward the right which allows for the farthest possible coverage of the stern section by roof 56. If, on the other hand, levers 64 are turned to the left, this would result in position H as demonstrated by the dot-dash line in which a portion of the stern section remains uncovered. Depending upon the construction and the weight of the roof the described adjustment can be achieved in a relatively easy manner even at high winds.

In FIG. 12 two further important features of the instant invention are shown. One is a ladder 68 which is designed as a parallelogram ladder and which is attached to the edge of the stern section 1. In its shown function this ladder serves as easy means of access to the boat from the water, or vice versa. It can, however, if the boat is parked on a camp ground in its folded-out position, serve as a means of access to the trailer from the ground. It further (as is shown in the dash-line) can serve as a ladder during the folded-up position to provide access to the mobile section via door 28. For that purpose the ladder is leaned against the face wall 43 and is easily adjustable to the varying height due to its parallelogram function. Such ladders are commercially available. The other important detail is a cover box 69 for the engine. This cover box 69 can be used as a table together with plate 70 which is framed by strips 71 to avoid the sliding off of objects if the plate is slightly tilted.

Roof 66 of the mobile section 2 provides for a cockpit opening 73 on the right side in the direction of travel, which can be closed by a lid 74. The cockpit opening thereby occupies a fraction of the horizontal portion of the roof, and a portion of the vertical section of the roof. Located between roof 66 and lid 74 is a crank-shaped lever 75 which serves as an adjustment hinge between the two elements. One shaft 76 in this crank 75 is pivotably disposed in a pipe which is installed in the roof 66 of the mobile section. Instead of the pipe it is possible to provide bearing sleeves which could be attached to the roof. By way of actuatable (not shown) adjustment elements the shaft 76 can be fixed in its respective swivelling position. Shaft 76 is disposed in approximately the longitudinal direction to the axis of the boat, whereby its pivoting axis is placed midway between the long side of the window. The other shaft 77 of this crank 75 is adjustable in the same fashion (not shown) and connected to the lid 74. In this position in addition to a swivelling motion it is further possible to shift lid 74 in the direction of shaft 77. Both positions are self-sustaining to a certain extent so that during adjustment lid 74 can possibly remain at a certain angle prior to being fixed in a selected position. A navigation control area is provided beneath the cockpit opening 73.

As shown in FIG. 14, there are various possible positions for lid 74 by way of the adjustable crank hinge 75. The solid line shows the position in which opening 73 is covered by lid 74. In this position, for example, it is possible to lock a door 79 by way of the vertical section 78 of the lid 74, whereby the width of the door corresponds to the length of the cockpit opening, and whose vertical section 78 with its end portion contacts the board wall via a door 79. This door 79 has the advantage that, for example, if the boat has almost docked, the skipper may exit and tie up the boat. Position J shows the position of lid 74 in which with regard to the boat axis its only contact is at the right outside section. It thereby glides on shaft 77. Position K shows the position in a dot-dash line whereby shaft 77, while remaining in its position, merely swivels the lid around the shaft, thereby achieving a diagonal position. This may, for example, be desirable when it is raining and this providing certain protection and good visibility. Dash-line L shows a position of the lid 74 in which it is moved slightly upward and parallel to the roof 66 of the mobile section, similar to that shown in FIG. 12. For this purpose shaft 76 as well as lid 74 are swivelled on shaft 77. Line M shows another position of lid 74 whereby it is placed on top of the roof 66 and completely opens cockpit opening 73. In order to take this dot-dash line position, lever 75 is displaced to its farthest extent by the swivelling motion of shaft 76 counter to the moving direction of the boat. Lid 74 is also swivelled accordingly on shaft 77. Lid 74 can (not shown) also serve as frame for a tranparent pane.

What is claimed and desired to be secured by Letters Patent is:

1. A folding boat comprising:

a bow section having a front end and a rear wall;
a stern section privotally connected to said bow section and having a front wall and a rear end;
one of said bow section and said stern section forming a tilt-up section which is pivotally movable with respect to the other of said bow section and said stern section forming a mobile unit, between a folded-out position in which said front wall and said rear wall are in opposing relation to each other and a folded-up position in which said tilt-up section tilts over and is situated above the mobile unit, with said folding boat providing an enclosed living area;
undercarriage means on said mobile unit for permitting movement of said folding boat on land in said folded-up position; and
said rear wall and said front wall forming a doorway opening to said enclosed living area when said folding boat is in said folded-up position.

2. A folding boat as defined by claim 1, further comprising a top-mount having a roof provided atop the mobile unit, such that the tilt-up section serves as a sturdy second roof in said folded-up position.

3. A folding boat as defined by claim 2, wherein the top-mount of the mobile unit has at least one of windows and ventilation openings which, in said folded-up position of the boat, are opposed by one of openings, windows and doors in walls of the tilt-up section.

4. A folding boat as defined by claim 1, wherein the bow and stern sections are constructed on base shells, and the height of the base shell of the mobile unit is greater than that of the tilt-up section.

5. A folding boat as defined by claim 1, further comprising a ladder with a parallelogram adjustment and movable to various locations, to serve as an entry ladder to at least one of the tilt-up section and a door.

6. A folding boat as defined by claim 1, wherein the stern section serves as the tilt-up section.

7. A folding boat as defined by claim 1, wherein the bow section serves as the tilt-up section.

8. A folding boat as defined by claim 1, further comprising a top assembly provided for the stern section during the folded-out position of the boat.

9. A folding boat as defined by claim 8, wherein the top assembly has a roof in the shape of a cabin roof which is connected to a rail of the tilt-up section.

10. A folding boat as defined by claim 9, wherein the connection is achieved by way of supports, and canvas-type coverings are provided between the roof and rail, of the tilt-up section.

11. A folding boat as defined by claim 1, in which said undercarriage means includes wheel means positioned just behind the center of gravity of the folding boat in the folded-out position.

12. A foldng boat as defined by claim 11, wherein said undercarriage means further includes control means for moving said wheel means between a retracted position within said mobile unit and an extended position extending from the bottom of said mobile unit.

13. A folding boat as defined by claim 11, wherein said undercarriage means further includes supporting moving element means connected to said mobile unit and movable between a retracted position within said mobile unit and an extended position extending from the bottom of said mobile unit for aiding removal of and connection of trailer means to said mobile unit, said supporting moving element means including a plurality of reel means and belt means positioned around said reel means.

14. A folding boat as defined by claim 1, further comprising spring means having a first end connected to said mobile unit and a second, opposite end, and lever means connected between said second, opposite end and said tilt-up section to aid in the pivoting movement of said tilt-up section with respect to said mobile unit with minimal physical exertion.

15. A folding boat as defined by claim 1, further comprising motor means positioned substantially midship of said folding boat when the latter is in said folded-out position and positioned exteriorly of said folding boat when the latter is in said folded-up position.

16. A folding boat as defined by claim 15, further comprising means for adjusting the height of said motor means.

17. A folding boat as defined by claim 1, further comprising means for raising said tilt-up section with respect to said mobile unit when said folding boat is in said folded-up position.

18. A folding boat as defined by claim 1, further comprising a mast having a sail mounted on one of said bow section and stern section.

19. A folding boat as defined by claim 1, further comprising an automotive hitch rod secured to said mobile unit at an end opposite to said doorway opening when said folding boat is in said folded-up position.

20. A folding boat as defined by claim 11, further comprising a supporting moving element attached to the mobile section at a position closer to the center of gravity of said folding boat than said wheel means when said folding boat is in said folded-out position.

21. A folding boat as defined by claim 20, wherein said supporting moving element is retractable within said folding boat when the folding boat is in said folded-out position.

22. A folding boat as defined by claim 14, wherein said spring means is tensioned to a greater extent when said folding boat is in said folded-up position and said folded-out position than when said folding boat is folded to an intermediate position between said folded-up position and said folded-out position.

23. A folding boat as defined by claim 15, further comprising a vertical opening positioned between said bow section and said stern section within which said motor means is positioned when said folding boat is in said folded-out position.

24. A folding boat as defined by claim 1, wherein said mobile unit includes side aprons extending down therefrom for providing stability against capsizing for said mobile unit and which also function as storage containers.

25. A folding boat as defined by claim 14, wherein said spring means includes gas spring means.

26. A folding boat comprising:
a bow section having a front end and rear wall;
a stern section pivotally connected to said bow section and having a front wall and a rear end;
one of said bow section and said stern section forming a tilt-up section which is pivotally movable with respect to the other of said bow section and said stern section forming a mobile unit, between a folded-out position in which said front wall and said rear wall are in opposing relation to each other and a folded-up position in which said tilt-up section tilts over and is situated above the mobile unit, with said folding boat providing an enclosed living area in said folded-up position;
said rear wall and said front wall forming an opening to said enclosed living area when said folding boat is in said folded-up position; and
motor means connected to one of said bow section and said stern section and positioned substantially midship of said folding boat when the latter is in said folded-out position and positioned exteriorly of said folding boat when the latter is in said folded-up position.

* * * * *